Feb. 17, 1959     C. CONE     2,873,862
SOAKING PIT COVER HANDLING APPARATUS
Filed Aug. 10, 1956     7 Sheets-Sheet 1
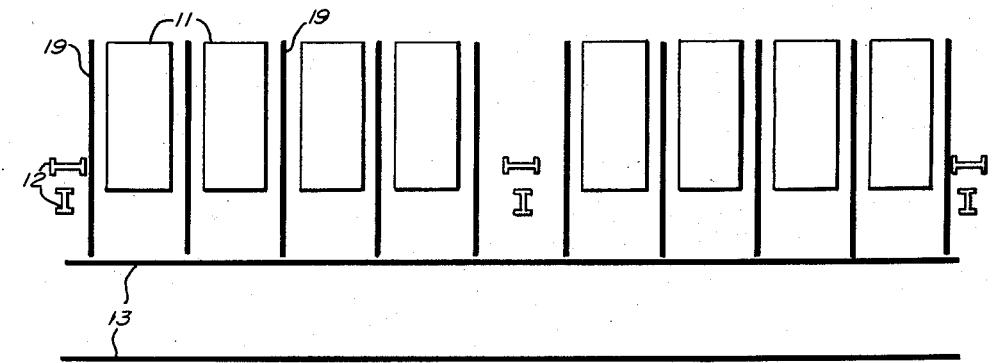
*Fig. I*
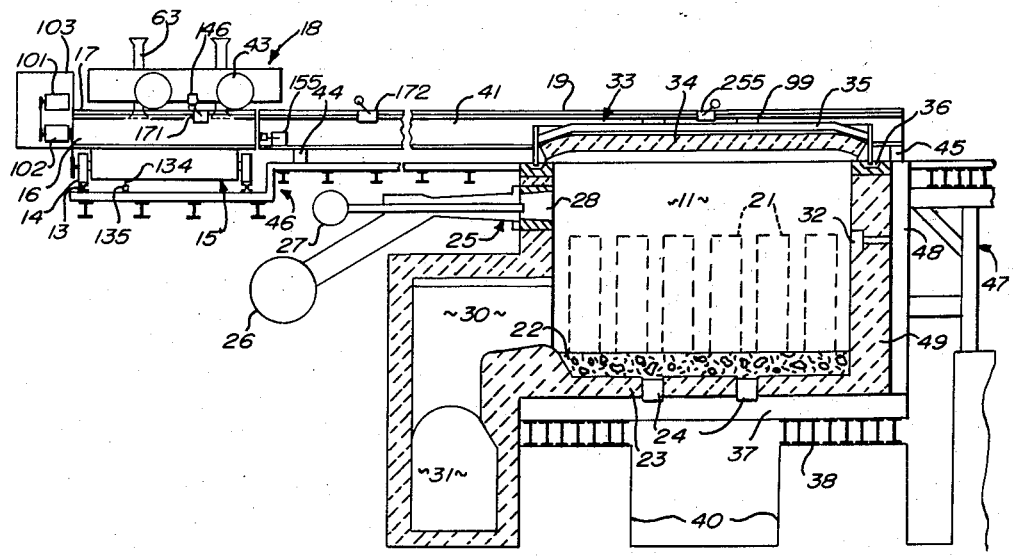
*Fig. II*
INVENTOR.
CARROLL CONE
BY

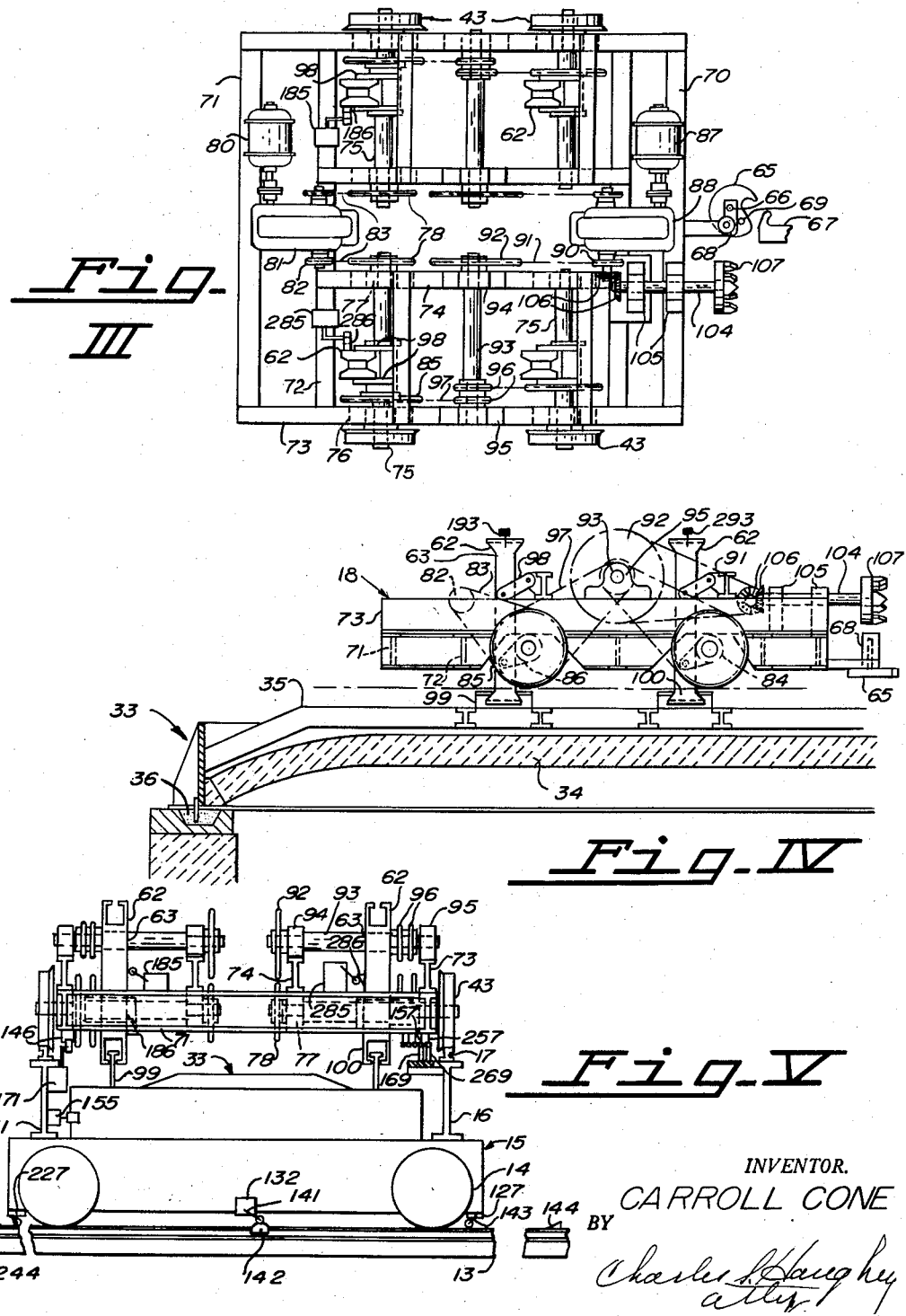

Feb. 17, 1959 C. CONE 2,873,862
SOAKING PIT COVER HANDLING APPARATUS
Filed Aug. 10, 1956 7 Sheets-Sheet 3
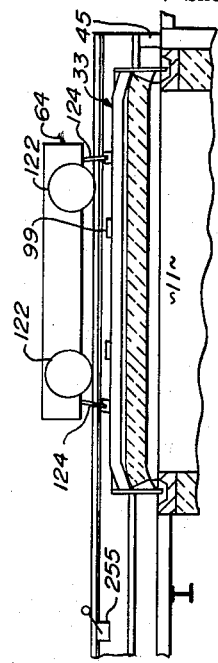
INVENTOR.
CARROLL CONE
BY
Charles S. Haughey
atty.

Feb. 17, 1959 C. CONE 2,873,862
SOAKING PIT COVER HANDLING APPARATUS
Filed Aug. 10, 1956 7 Sheets-Sheet 4
Fig. VII
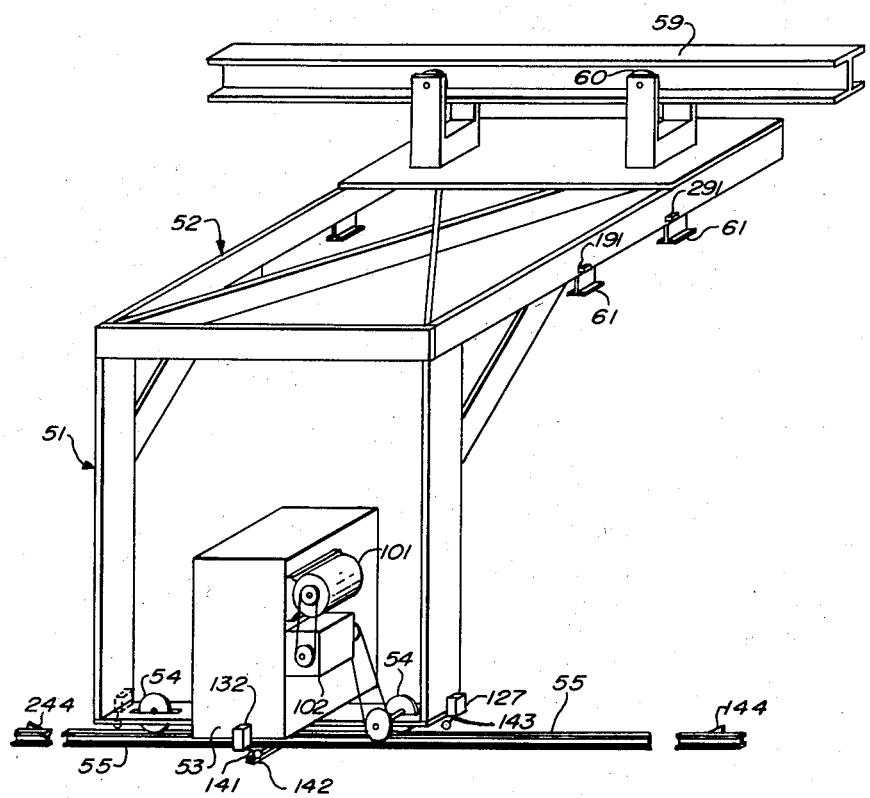
INVENTOR.
CARROLL CONE
BY
Charles L. Haughey
Atty.

Feb. 17, 1959 C. CONE 2,873,862
SOAKING PIT COVER HANDLING APPARATUS
Filed Aug. 10, 1956 7 Sheets-Sheet 5
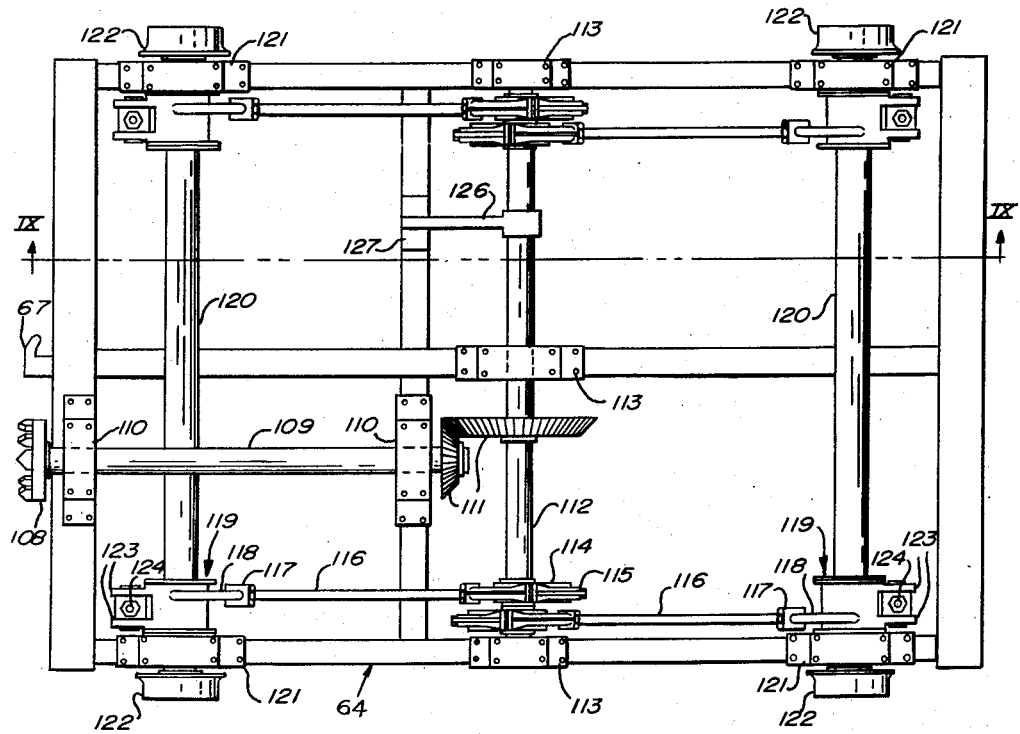
*Fig. VIII*
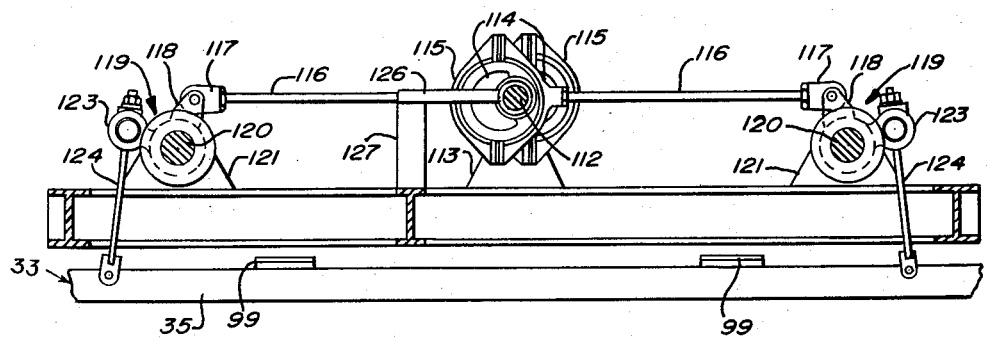
*Fig. IX*
INVENTOR.
CARROLL CONE
BY
Charles S. Haughey
Atty.

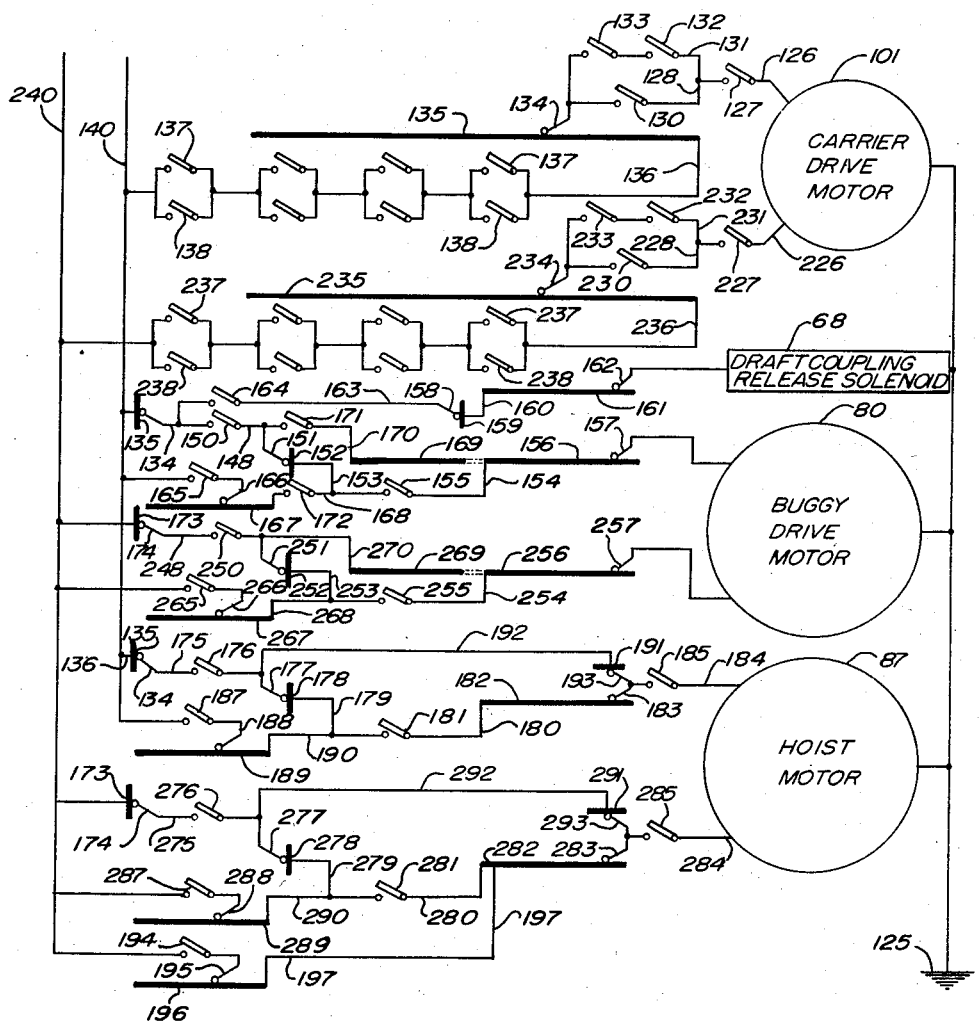
Fig. X
INVENTOR.
CARROLL CONE
BY
Charles S. Haughey
atty.

Feb. 17, 1959 C. CONE 2,873,862
SOAKING PIT COVER HANDLING APPARATUS
Filed Aug. 10, 1956 7 Sheets-Sheet 7
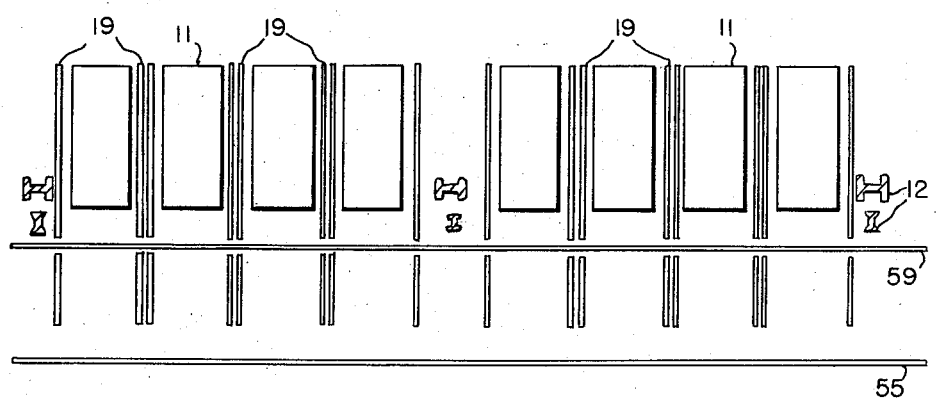
Fig. XII
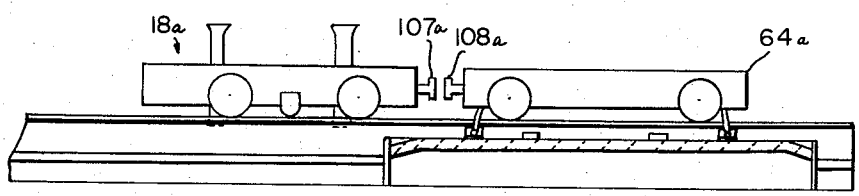
Fig. XIII
INVENTOR.
CARROLL CONE
BY
Charles S. Haughey
ATTORNEY

United States Patent Office 2,873,862
Patented Feb. 17, 1959

2,873,862

SOAKING PIT COVER HANDLING APPARATUS

Carroll Cone, Toledo, Ohio, assignor to Surface Combustion Corporation, Toledo, Ohio, a corporation of Ohio Application August 10, 1956, Serial No. 603,388

18 Claims. (Cl. 212—4)

This invention relates to apparatus for handling the covers of soaking pit furnaces and the like.

Soaking pit furnaces are well known in steel mill operations and are used to re-heat to and hold at a desired temperature ingots that are produced from steel mill operations. The ingots are subsequently removed and subjected to hot rolling operations. These operations require the ingots be at proper temperature and uniformly heated throughout to assure proper forming thereof.

Generally, as many as forty soaking pit furnaces are placed transversely in a row and grouped in batteries of three or four, confining this heat treating operation to one site. Each pit normally contains six to ten ingots, each of which is charged and removed separately. During each of these actions the cover of the furnace must be opened and closed. Such covers span the entire top of the furnace chamber which may comprise dimensions of eight by twenty feet. Furthermore, the covers must be heavily insulated. These requirements necessitate covers that often weigh twenty tons or more.

In opening and closing such covers, two types of apparatus have been employed. The first consists of a crane supported on two rails that are laid on the floor on either side of the row of furnaces. Such apparatus is disclosed in Patent Number 2,340,910 entitled "Soaking Pit Cover Crane." This apparatus is not well suited for a single row of large pits as is now commonly used since space is required between the adjacent pits to which the cover may be moved while the overhead crane is charging or removing ingots. If, with the present arrangement of soaking pit furnaces, the covers were moved to spaces between the adjacent furnaces, the length of the structure necessary to span both the furnaces and the adjacent spaces would tend to be excessive. In addition, building or other structural columns are frequently located between these furnaces or batteries thereof. This situation prohibits the use of this type of cover moving device.

The second type of apparatus frequently employed is mechanism individually attached to each cover that is capable of raising the cover and moving it to one end of the furnace. Such mechanism represents considerable cost when applied to a large number of such furnaces.

The present invention provides novel apparatus for operating a number of covers that does not have the disadvantages of the aforementioned crane nor does it involve the expense of a number of individual cover operating mechanisms.

For further consideration of what is novel refer to the drawing, specification, and claims.

In the drawing:

Figure I is a floor plan of a row of soaking pit furnaces provided with cover-handling apparatus embodying the invention.

Figure II is a transverse section showing one of the soaking pits of Figure I.

Figure III is a plan view of a cover-handling buggy which may be used in the present apparatus.

Figure IV is a side elevation showing the buggy in position to lift a furnace cover.

Figure V is an end elevation of the apparatus shown in Figure II, with the operator's cab removed.

Figure VI is a fragmentary transverse section showing a carriage attached to the furnace cover.

Figure VII is an isometric view showing a modified form of carrier for the buggy.

Figure VIII is a plan view of the carriage shown in Figure VI.

Figure IX is a vertical section on the line IX—IX of Figure VIII.

Figure X is a diagram of electrical circuits that may be used with the present apparatus.

Figure XI is a side elevation of the carrier shown in Figure VII.

Figure XII is a modified floor plan in accordance with the arrangement shown in Figure XI.

Figure XIII illustrates the use of electro-mechanical means coupling the buggy to the carriage.

In the floor plan shown in Figure I, soaking pits 11 are arranged in a parallel manner in a row, and are grouped in batteries of four. Although only two batteries are shown in Figure I, it is to be understood that a single installation usually consists of ten or more batteries of pits. Building columns 12 are located between the batteries in Figure I, in accordance with common practice.

Extending parallel to and at one side of the row of pit furnaces 11 are a pair of rails 13, on which travel the wheels 14 of a car 15 shown in Figure II. On the car 15 are mounted a pair of horizontal beams 16, which extend transversely of the car and carry rails 17 for supporting a buggy 18. The car 15 serves as a carrier for the buggy 18, and may be stopped opposite any one of the pit furnaces 11, with the rails 17 on the car in alignment with a pair of stationary rails 19, so that the buggy may travel from the car onto the stationary rails 19.

Each soaking pit 11 is a combustion chamber in which ingots 21 are set on coke breeze 22 laid on a hearth 23. Drains 24 are provided for the removal of scale, slag and coke breeze during cleaning of the pit. Ingots in the pit are heated by means of a flame from a burner 25, which is supplied with air from a manifold 26 and is supplied with gas from a manifold 27. The flame enters the pit 11 through a burner port 28, and the products of combustion are exhausted through a flue port 30, from which they travel through a passage 31 to a stack (not shown), each passage 31 and the associated stack being common to the four soaking pits in a battery. Temperature sensing apparatus (not shown) is provided in a recess 32 to control the amount of the combustible mixture supplied to the burner, in order to maintain a uniform temperature in the pit.

Each soaking pit cover 33 comprises a refractory arch 34 supported in a metal case 35. When in position above the pit, each cover rests in a sand seal 36 that extends around the upper perimeter of the pit. The pit and its charge are substantially supported by beams 37 and 38 resting on concrete abutments 40.

A beam 41 supports each of the stationary rails 19 that receive the wheels 43 of the buggy 18, and is in turn supported by cross beams 44 and 45. A reinforced floor 46 supports the cross beams 44 and 45 as well as the rails 13. Additional reinforcing structures may be provided, including for example a truss 47 and a vertical beam 48 for strengthening the pit furnace wall 49.

Another type of carrier for the buggy 18 is shown in Figures VII and XI. This type of carrier is a gantry crane 50 comprising vertical and horizontal rigid rectangular structures 51 and 52. The structure 51 contains an operator's cage 53 and is supported by means of wheels 54 on a rail 55. Building columns 56 support beams 57 and 58 that carry an I-beam rail 59, which in turn supports rollers 60 that are provided on the horizontal rectangular structure 52. Also provided on the structure 52 are hangers 61 adapted to support the upper claws 62 of hoisting members 63 on the buggy 18.

Figure IV shows a carriage 64 attached to the cover 33, and the buggy 18 is adapted to operate the carriage 64. For that purpose, as shown in Figures III and IV, a draft coupling member 65 of a known type is pivotally mounted at 66 on a bracket rigidly attached to the buggy 18. When the buggy 18 is moved toward the carriage 64, the pivoted draft coupling member 65 is contacted by a cooperating coupling member 67 fixed to the carriage 64. Further movement of the buggy 18 toward the carriage 64 then causes the pivoted coupling member 65, as seen in Figure III, to rotate in a clockwise direction until the core pin of a solenoid 68 drops into a socket 69 provided in the upper surface of the pivoted coupling member 65. The rotation of the coupling member 65 also causes it to interlock with the opposed coupling member 67. When the buggy 18 and the carriage 64 have been thus coupled together and it is desired to separate the buggy from the carriage, the solenoid 68 is energized to lift its core pin out of the socket 69, and the buggy is moved away from the carriage and pit.

The buggy 18 as shown is also adapted to lift the cover 33 independently of the carriage 64. If used in the manner, as shown in Figs. II, IV and V it will be apparent that the draft coupling member 65 and shaft drive coupling member 107 together with their necessary complementary members may be omitted.

It will also be apparent that upper claws 62 of the hoisting members 63 are not required in the arrangement of Fig. II and when carrier 15 and buggy 18 are used in connection with covers provided with carriages 64, the hoisting members 63 may be eliminated.

In the arrangement of Fig. XI, the lower claw members 100 are not required when the buggy 18 is used in connection with carrier 64 of Fig. VI.

As shown in Figures III, IV and V, the buggy 18 has a rigid frame made of suitable beams 70, 71, 72, 73 and 74. Each of the wheels 43 of the buggy is attached to an axle 75 that extends through bearings 76 and 77. Secured to the inner ends of two of the axles 75 are sprockets 78, which are driven by a buggy drive motor 80 through a speed reducer 81, sprockets 82 and chains 83.

Hubs 84 with sprockets 85 and hoisting arms 86 attached are rotatably mounted on the axles 75. The hubs 84 are driven by a hoist motor 87 through a speed reducer 88, sprockets 90, chains 91, sprockets 92, shafts 93 which extend through bearings 94 and 95, sprockets 96, chains 97 and sprockets 85. The hoisting members 63 are moved up or down by means of the arms 86, to which the hoisting members 63 are pivotally connected, and are guided by links 98 that are connected to the frame of the buggy. In order to simplify the drawing, the motors 80 and 87 and the speed reducers 81 and 88 are shown only in Figure III.

As shown in Figures IV and V, the cover 33 is provided with I-beam segments 99 which are welded to the metal case 35 and are adapted to be engaged by lower claws 100 of the hoisting members 63.

The drive for the car 15 is shown in Figure II, and comprises a reversible motor 101 and a speed reducer 102 mounted on the operator's cage 103 of the car 15. Power is transmitted by chain and sprocket drives from the motor 101 to the speed reducer 102 and from the speed reducer 102 to a wheel 114 of the car 15. The crane 50 is similarly driven.

The buggy 18 is provided with a shaft 104 that is mounted in bearings 105 and is driven by the speed reducer 88 through bevel gears 106. Whenever the draft coupling member 65 on the buggy 18 is interlocked with the coupling member 67 on the carriage 64, a shaft coupling member 107 on the shaft 104 is in engagement with a shaft coupling member 108 on a shaft 109 that rotates in bearings 110 mounted on the frame of the carriage 64. The shaft 109, through bevel gears 111, drives a transverse shaft 112 that is journaled in bearings 113 mounted on the frame of the carriage. Fixed on the transverse shaft 112 are four eccentrics 114, each of which is surrounded by a large bearing 115 forming one end of a connecting rod 116. Each of the connecting rods 116 has its other end 117 pivotally connected to an arm 118 of a bell crank 119. Two axles 120 are mounted in four bearings 121 on the frame of the carriage 64, and carry wheels 122 that run on the same rails 19 as the wheels of the buggy 18. Each of the bell cranks 119 is rotatably mounted on one of the axles 120 and is provided with a pair of arms 123 to which is pivotally connected the upper end of a link 124. The lower ends of the links 124 are pivotally connected to the metal case 35 of the cover 33.

In the arrangement illustrated in Figure VI, the cover 33 is lifted by means of the links 124 on the carriage 64, instead of being lifted by the hoisting members 63 on the buggy 18. When the buggy 18 is used to lift the cover by means of the carriage 64, the hoisting mechanism on the buggy 18 executes the same movement as it does when the cover is lifted by means of the hoisting members 63, but the power for lifting the cover is transmitted through the shaft coupling members 107 and 108. In Figure IX the hoisting mechanism is shown in the raised position. When the hoisting mechanism is in the lowered position, each of the eccentrics 114 is in a position displaced by an angle of approximately 180° from the position in which it is shown in Figure IX. As the eccentrics 114 move toward the positions in which they are shown in Figure IX, they draw the connecting rods 116 inward, thus turning the four bell cranks 119 so as to raise the arms 123 and the links 124.

When the operation of lifting the cover has been completed, an arm 126 fixed on the transverse shaft 112 rests against a block 127 mounted on the frame of the carriage 64. When the arm 126 comes in contact with the block 127, the eccentrics 114 are slightly past dead center, so that after being lifted the cover is allowed to move downward slightly at the end of the lifting operation. In this manner the hoisting mechanism on the carriage 64 is adapted to lock itself in the raised position so that the buggy 18 can be disengaged and withdrawn from the carriage 64 to leave the cover in the raised position.

The operation of lowering the cover by means of the mechanism on the carriage 64 is the reverse of the lifting operation. The lowering operation starts with the mechanism in the position shown in Figure IX, where the eccentrics are slightly past dead center. As the arm 126 begins to move away from the block 127, the furnace cover is lifted slightly until the eccentrics 114 reach dead center, and thereafter the cover is lowered until it rests in the sand seal 36, when the eccentrics 114 will be in positions at an angle of approximately 180° from the positions in which they are shown in Figures VIII and IX.

From the foregoing description it is apparent that both in the arrangement of Figure II and in the arrangement of Figure XI, means are provided for guiding the buggy 18 along a path that is parallel to and wholly at one side of the row of pit furnaces 11. Moreover, both the installation of Figure II and the installation of Figure XI provide a carrier, separable from the buggy, for receiving the buggy and transporting it along such path, so that the operator may remain on the carrier while the buggy is on the rails 19 where it is exposed to the furnace heat. The car 15 shown in Figure II and the gantry crane 50 shown in Figure XI are alternative forms of carriers for the buggy 18, which may be used to lift a furnace cover 33 with or without the use of a carriage 64. It will be noted that when a carriage 64 is used, the stationary rails 19 should be somewhat longer so that the furnace cover 33, after having been lifted by the carriage, can be wholly withdrawn from above the pit furnace by means of the buggy 18.

In the arrangement shown in Figure II, the stationary rails 19 are long enough so that the cover 33 while supported by the buggy 18 can be moved far enough to uncover the entire pit 11 without bringing any of the wheels 43 of the buggy 18 upon the car 15. Thus the buggy 18 can be used to operate the cover 33 while the car 15 is at some other pit. Moreover, it is not desirable to have the buggy 18 run from the stationary rails 19 onto the rails 17 of the car 15 while the buggy is supporting the cover 33, because in crossing the gap between the stationary rails 19 and the aligned rails 17 the buggy would jolt the cover 33, with consequent danger of damage to the firebrick arch 34.

Depending on the number of furnaces in an installation, two or more buggies may be provided and may be moved from one pit to another by means of a single carrier. If all of the pit covers in an installation are provided with carriages 64, the buggy or buggies may be of relatively light construction because they will not be called upon to lift and support the heavy furnace covers. On the other hand, an installation may be provided with only one or two carriages, which are transported from pit to pit by means of the overhead ingot crane, and are used only when it is desired to leave a pit uncovered for an extended period, as during a cleaning operation. Such use of the carriage 64 will avoid tying up a buggy at one pit while an extended cleaning or repair operation is being carried on at that pit.

In the operation of the apparatus shown in Figure II, the car 15 moves along the rails 13 and stops in a position such that the rails 17 on the car are in alignment with stationary rails 19 corresponding to one of the pit furnaces 11. With the hoisting members 63 in their lower positions, the buggy 18 then is moved on the rails 19 to a position in which the lower claws 100 of the hoisting members 63 are aligned with the I-beam segments 99, as shown in Figure IV. The hoisting members 63 then are raised to lift the cover 33, and the buggy 18 is moved away from the pit far enough to allow the overhead ingot crane access to the desired part of the pit. When the operation of charging or removing the ingot has been completed, the buggy 18 is returned to a position centrally above the pit, and the hoisting members 63 are lowered to replace the cover 33 on the pit. The buggy 18 then can be returned to the car 15 so that it can be transported to the next pit where it will be needed.

Figure XI shows the buggy 18 as being supported by the gantry crane 50, the hoisting members 63 being in their lower positions with respect to the buggy. When the gantry crane is stopped in alignment with one of the pit furnaces, the buggy 18 may be deposited upon the rails 19 by extending the hoisting members 63 to their upper positions, so that the upper claws 62 of the hoisting members 63 are no longer supported by the hangers 61. The buggy then can be traversed toward the pit on the rails 19. When the buggy 18 is to be picked up by the crane, it is moved toward the crane with the hoisting members 63 in their upper positions, until the upper claws 62 are aligned with the hangers 61. Movement of the hoisting members 63 toward their lower positions with respect to the buggy 18 then causes the buggy to be raised clear of the rails 19.

The use of the car 15 is somewhat simpler than the use of the gantry crane 50, because the operation of traversing the buggy 18 toward or away from the pit furnace causes the buggy 18 to be removed from or returned to the car 15. However, with a given installation of pit furnaces and rails 19, the arrangement shown in Figures XI and XII may save floor space because of the fact that the crane overhangs the rails 19, whereas the car 15 requires space wholly beyond the ends of the rails 19. Moreover, the path traveled by the carrier is at one side of the row of furnaces, and therefore is just beyond the row of columns supporting the roof of the pit furnace room, so that a convenient support for a gantry crane is available.

Electrical connections are provided to permit the buggy to be controlled by the operator of the buggy carrier when the buggy carrier is stationed in alignment with the particular rails 19 on which the buggy is being operated. In addition, electrical connections are provided to permit the buggies to be remotely controlled by the operator of ingot crane, so that the buggy carrier may be used principally to move the buggies from one pit to another, while the ingot crane operator controls the removal and replacement of the covers by the buggies.

The electrical system incorporates automatic stops that allow the buggy to be remotely controlled by the buggy carrier operator or by the ingot crane operator, and in addition provides several safety features that prevent equipment damage.

As indicated in Figure X, the reversible carrier drive motor 101 is operated in one direction by means of current through a circuit including ground 125, the carrier drive motor 101 and a lead 126. The lead 126 contains a normally closed limit switch 127. A lead 128, containing a control switch 130, and a lead 131, containing a normally closed switch 132 and a control switch 133, are connected in parallel between the lead 126 and a shoe 134 that travels on a conducting rail 135 extending along the path of travel of the carrier. The conducting rail 135 is connected to a lead 136 which contains, in parallel, a normally closed limit switch 137 and a normally open safety switch 138 for each pit served by the carrier, and which is connected to a power line 140. For the sake of simplicity, only four of the switches 137 and 138, corresponding to four pit furnaces, are shown in Figure X.

As indicated by Figures V and VII, the normally closed switch 132 is mounted on the carrier, and is provided with an actuating arm 141. Located opposite each of the pit furnaces 11 is a cam 142 which lifts the arm 141 to open the switch 132 whenever the carrier is in exact alignment with the rails 19 corresponding to one of the pit furnaces 11. The normally closed limit switch 127 also is mounted on the carrier, and has an actuating arm 143 that is lifted by a cam 144 to open the switch 127 when the carrier reaches the end of its travel in the direction in which it is driven by current from the power line 140.

If it is assumed that the carrier is at its extremity of travel toward the left in Figure V or VII, the carrier operator may start the carrier traveling toward the right by closing the contol switch 133, which is located in the operator's cage on the carrier. The carrier then travels toward the right until the switch 132 is opened by the first cam 142, and the opening of that switch stops the carrier in alignment with the first pit furnace 11.

Then when the carrier is standing opposite one of the pits, with the control switch 133 closed and the switch 132 open, the carrier operator may start the carrier moving toward the right by closing momentarily the control switch 130, which is also located in the operator's cage on the carrier. If the control switch 130 is held closed, the carrier will pass each pit, and after passing the last pit will continue moving toward the right until the limit switch 127 is opened by the cam 144.

The pairs of switches 137 and 138 interposed in the lead 136 are required only when the carrier is a crane, as in Figure XI, and may be omitted from the lead 136 when the carrier is a car, as in Figure II.

Each normally closed limit switch 137 is mounted on one of the rails 19 in Figure XI, near the end of the rail remote from the corresponding pit furnace, and is provided with an arm 145 that is depressed by a cam 146 on the buggy 18 to open the switch 137 when the buggy reaches the extremity of its travel toward the left in Figure XI, where it is in position to be picked up by the gantry crane 50. When the buggy is in that position, an actuating arm 147 on the normally open safety switch 138 is depressed by one of the hoisting members 63 so as to hold the switch 138 closed, provided that such hoisting member is in its lower position. Thus when the buggy 18 is in that position with the hoisting members 63 raised, the pair of switches 137 and 138 are both open, so as to prevent movement of the gantry crane 50 in either direction. If movement of the gantry crane were permitted under such conditions, the hangers 61 on the gantry crane would be liable to strike the raised hoisting members 63, or if the hoisting members already were in alignment with the hangers 61 the gantry crane would attempt to drag the buggy 18 while the wheels 43 of the buggy were still in contact with the rails 19. After the buggy 18 has been picked up by the gantry crane, the normally closed limit switch 137 no longer is held open by the cam 146, so that the circuits are in condition to permit the gantry crane to travel.

To drive the carrier toward the left in Figures V and VII, the carrier drive motor 101 is supplied with current through a circuit including the ground 125 and a lead 226. The lead 226 contains a normally closed limit switch 227, which is opened by a cam 244 when the carrier reaches its extremity of travel to the left in Figures V and VII. A lead 228, containing a control switch 230, and a lead 231, containing normally closed contacts 232 and a control switch 233, are connected in parallel between the lead 226 and a shoe 234 that travels on a conducting rail 235. The normally closed contacts 232 are arranged to be opened by the arm 141 whenever the switch 132 is opened. The rail 235 is connected through a lead 236 to the power line 240, pairs of contacts 237 and 238 in parallel being interposed in the lead 236. Each of the contacts 237 is normally closed and is arranged to be opened by one of the arms 145 simultaneously with the corresponding limit switch 137. Each of the contacts 238 is normally open and is arranged to be closed by one of the arms 147 simultaneously with the corresponding safety switch 138.

The operation of the carrier in its travel toward the left will be clear from the description of its operation in its travel toward the right.

Whenever the carrier is stopped in alignment with the rails 19 corresponding to one of the pit furnaces, the carrier operator can control the movement of the buggy toward the left in Figures II and XI by means of a circuit including the traveling shoe 134, the buggy drive motor 89 and the ground. This circuit also includes a lead 148 in which is interposed a control switch 150 located in the carrier operator's cage. The lead 148 is connected to a traveling shoe 151 which contacts a stationary conducting segment 152, one such segment being provided for each of the pit furnaces. The conducting segment 152 is connected by a lead 153 to another lead 154, which includes a normally closed limit switch 155 and is connected to a conducting rail 156 extending along one of the rails 19. A shoe 157 for supplying current to operate the buggy drive motor to move the buggy toward the left in Figures II and XI travels on the conducting rail 156.

Whenever the carrier is in alignment with the rails 19 corresponding to one of the pit furnaces 11, the traveling shoe 151 is in contact with the conducting segment 152 corresponding to that pit furnace, and another traveling shoe 158 on the carrier is in contact with another stationary conducting segment 159. The latter conducting segment is connected by a lead 160 to another conducting rail 161 that extends along one of the stationary rails 19. A shoe 162 which is mounted on the buggy and travels along the conducting rail 161 is connected to one side of the draft coupling release solenoid 68, and the other side of the draft coupling release solenoid is grounded as indicated in Figure X. The circuit for supplying current to the draft coupling release solenoid is completed by a lead 163 which connects the traveling shoe 158 to the main traveling shoe 134, and contains a control switch 164 located in the carrier operator's cage.

When the gantry crane shown in Figure XI is aligned with the rails 19 corresponding to one of the pit furnaces, the circuits just described permit the gantry crane operator to control movement of the buggy toward the left, by means of the control switches 150 and 164. In the arrangement shown in Figure XI, the limit switch 155 consists of normally closed contacts arranged to be opened by the arm 145 simultaneously with the corresponding limit switch 137. When the operator closes the control switch 150, the buggy will travel toward the left in Figure XI until the cam 146 on the buggy depresses the arm 145 to open the normally closed contacts 155, causing the buggy to stop. If the buggy has been coupled to the carriage 64 and the cover has been lifted, the carriage and cover will be pulled toward the left in Figure VI by the buggy when the operator closes the control switch 150. However, if the operator closes both the control switch 150 and the control switch 164, the draft coupling release solenoid will be energized to release the carriage from the buggy, so that the buggy will travel toward the left in Figure VI without taking the carriage with it.

Another switch 165 for controlling movement of the buggy toward the left in Figure XI is located in the cab of the overhead ingot crane, and is interposed between a traveling shoe 166 and a source of power represented as the power line 140. The shoe 166 travels along a conducting rail 167, which extends along the path of movement of the ingot crane and is connected by a lead 168 to the lead 154 which in turn is connected to the conducting rail 156.

The circuits just described for operating the buggy drive motor can be used also for the installation shown in Figure II. For that installation, however, it is necessary to provide another conducting rail 169 which is mounted on the car 15 and extends along one of the rails 17. The conducting rail 169 is connected to the lead 148 by a lead 170 containing a normally closed limit switch 171. The limit switch 171 is mounted on the car 15 and is so located that it is opened by the cam 146 on the buggy 18 when the buggy has traveled far enough toward the left so that all four of the buggy wheels 43 are supported on the car 15.

In the installation shown in Figure II, the normally closed limit switch 155 is located so that it is not actuated by the cam 146, but is contacted and opened by the cover 33 when the cover is supported by the buggy 18 and the buggy 18 is approaching the left hand ends of the rails 19. Also in the installation of Figure II, a normally closed limit switch 172, which is not necessary in the installation of Figure XI, is interposed in the lead 168, and is located in such a position that it is opened by the cam 146 on the buggy 18 as the buggy approaches the left hand ends of the rails 19 in Figure II. Thus the ingot crane operator, by closing his control switch 165, can cause the buggy 18 to move toward the left in Figure II only until it approaches the left hand ends of the rails 19, when the limit switch 172 will be opened by the cam 146. The carrier operator, on the other hand, by closing his control switch 150, can cause the buggy, if it is not supporting the cover 33, to move toward the left in Figure II until it passes onto the car 15 and finally opens the limit switch 171.

In order to permit the carrier operator to operate the buggy drive motor 80 to move the buggy toward the right in Figures II and XI, the motor 80 can be supplied with current from the power line 240 by a conducting rail 173 which extends along the path of movement of the carrier and is contacted by a traveling shoe 174 on the carrier. A lead 248 containing a control switch 250 located in the carrier operator's cage connects the traveling shoe 174 to another traveling shoe 251 mounted on the carrier. Whenever the carrier is in alignment with the rails 19 corresponding to one of the pits, the traveling shoe 251 on the carrier is in contact with a stationary conducting segment 252 which corresponds to the same pit. The conducting segment 252 is connected by a lead 253 to another lead 254, which contains a normally closed limit switch 255 and is connected to a conducting rail 256. The conducting rail 256 extends along one of the rails 19 and is contacted by a traveling shoe 257 which is mounted on the buggy and is connected to the buggy drive motor.

In order to permit the ingot crane operator to control movement of the buggy toward the right in Figures II and XI, a control switch 265 located in the ingot crane operator's cab is interposed between a traveling shoe 266 and a source of power indicated as the power line 240. The shoe 266 travels on a conducting rail 267 which is connected by a lead 268 to the lead 254 that contains the limit switch 255.

The normally closed limit switch 255 is located in such a position that it is contacted by the cam 146 on the buggy 18 and opened as the buggy reaches the extremity of its travel toward the right in Figure II or VI. It will be understood that in the installation shown in Figure II, the limit switch 255 is opened when the buggy reaches a position above the middle of the pit 11 where the lower claws 100 on the hoisting members 63 are in alignment with the I-beam segments 99, and that in the installation shown in Figure VI the limit switch 255 is located in such a position that it is opened just as the coupling members on the buggy 18 come into engagement with the corresponding coupling members on the carriage 64.

Whenever a buggy is located on the rails corresponding to a particular pit furnace, the ingot crane operator can cause the buggy to move toward the right in Figure II or XI by closing the control switch 265 corresponding to that pit furnace, and if that switch remains closed the buggy will continue to move toward the right until the limit switch 255 opens. The same operation occurs when the carrier is stationed in alignment with a pit furnace and the carrier operator closes his control switch 250. However, in the installation shown in Figure II, the car 15 is provided with a conducting rail 269, which is shown in Figures V and X, and which is aligned with a stationary conducting rail 256 whenever the car 15 is in alignment with any particular pit furnace. The conducting rail 269 is connected by a lead 270 to the lead 248 that contains the control switch 250, so that the operator of the car 15, by closing the control switch 250 when the buggy is on the car and the car is in alignment with a particular pit furnace, can cause the buggy to travel toward the right along the rails 17 onto the rails 19. If the control switch 250 remains closed the buggy will continue traveling toward the right until the limit switch 255 is opened.

Whenever the carrier shown in Figure II or XI is standing in alignment with one of the pit furnaces, the carrier operator can operate the hoist motor 87 on a buggy 18 at the same location to raise the hoisting members 63, by current supplied from the traveling shoe 134. A lead 175 containing a control switch 176 located in the carrier operator's cage connects the shoe 134 to another traveling shoe 177 mounted on the carrier. When the carrier is in alignment with a particular pit furnace, the shoe 177 contacts a stationary conducting segment 178 corresponding to that pit furnace, the conducting segment 178 being connected by a lead 179 to another lead 180 that contains normally closed contacts 181. The lead 180 in turn is connected to a conducting rail 182 extending along one of the rails 19. A shoe 183 which is mounted on the buggy 18 and travels along the conducting rail 182 is connected to the hoist motor 87 by a lead 184 containing a normally closed limit switch 185.

As shown in Figure V, the limit switch 185 is mounted on the buggy 18 in such a position that it is opened by a cam 186 on one of the hoisting members 63 as the hoisting members reach their upper positions. In the installation shown in Figure XI, the normally closed contacts 181 are arranged to be opened by the arm 145 simultaneously with the corresponding limit switch 137 when the buggy is in its extreme left hand position on the rails 19. The normally closed contacts 181 may be omitted from the lead 180 in the installation shown in Figure II, because the contacts 181 are intended merely to prevent the hoisting members 63 from being raised when the buggy in the installation of Figure XI is in position to be picked up by the gantry crane 50.

The hoist motor 87 may be operated to raise the hoisting members 63 either by closing the carrier operator's control switch 176, or by closing a control switch 187 located in the ingot crane operator's cab to connect a traveling shoe 188 to a source of power indicated as the power line 140. The shoe 188 travels on a conducting rail 189 which extends along the path of travel of the ingot crane and is connected by a lead 190 to the lead 180.

As indicated in Figures VII and X, the gantry crane 50 is provided with a conducting segment 191, which is connected by a lead 192 to the lead 175, and is contacted by a shoe 193 on one of the hoisting members 63 whenever the hoisting members 63 are in position to be supported by the hangers 61.

When the buggy 18 is supported by the gantry crane as shown in Figure XI, the hoisting members 63 are in their lowered positions with respect to the buggy 18, and the shoe 183 is lifted clear of the conducting rail 182, but the shoe 193 is in contact with the conducting segment 191 on the gantry crane, so that closing of the control switch 176 causes the hoisting members 63 to move toward their raised positions. In any case, while the control switch 176 or 187 is closed, movement of the hoisting members 63 toward their upper positions continues until the limit switch 185 is opened.

The carrier operator can operate the hoist motor 87 to lower the hoisting members 63 by current supplied from the traveling shoe 174. A lead 275 containing a control switch 276 located in the carrier operator's cage connects the traveling shoe 174 to another shoe 277 mounted on the carrier. A stationary conducting segment 278 is so located that when the carrier is in alignment with the corresponding pit, the conducting segment 278 is contacted by the shoe 277. A lead 279 connects the conducting segment 278 to a lead 280 containing normally closed contacts 281. The lead 280 in turn is connected to a conducting rail 282 which extends along one of the rails 19 and which is contacted by a shoe 283 mounted on the buggy 18. A lead 284 containing a normally closed limit switch 285 connects the shoe 283 to the hoist motor 87.

In order to permit the ingot crane operator to operate the hoist motor 87 to lower the hoisting members 63, a control switch 287 is located in the ingot crane operator's cab and is interposed between a traveling shoe 288 on the ingot crane and a source of power indicated as the power line 240. The shoe 288 travels on a conducting rail 289 which extends along the path of movement of the ingot crane and is connected by a lead 290 to the lead 280.

When the hoisting members 63 are in position to be supported by the hangers 61 on the gantry crane 50, a conducting segment 291, connected by a lead 292 to the lead 275, is contacted by a shoe 293 mounted on one of the hoisting members 63.

The limit switch 285 is located on the buggy 18 in such a position that it is opened by a cam 286 on one of the hoisting members 63 as the hoisting members reach their lower positions. In the installation shown in Figure VI, the normally closed contacts 281 may be omitted from the lead 280, because the contacts 281 are required only in the installation shown in Figure II, where they are arranged to be opened by the cam 146 simultaneously with the limit switch 255 as the buggy 18 reaches a position centrally above the pit 11. The purpose of the normally closed contacts 281 in the installation shown in Figure II is to prevent the hoisting members 63 from being lowered when the buggy 18 has been moved above the cover 33 because the lowering of the hoisting members 63 under those conditions would cause the hoisting members 63 to strike the I-beam segments 99, thus jarring the cover 33.

In the installation shown in Figure II, since the contacts 281 prevent the hoisting members 63 from being lowered by means of the control switch 276 and 287 when the buggy 18 is centered above the pit furnace, an additional control switch 194 is provided in the ingot crane operator's cab for lowering the hoisting members 163 when the hoisting members 63 are supporting the cover 33 and the buggy 18 has been moved back above the pit furnace. The control switch 194 is used only for replacing the cover 33 on the pit furnace, whereas the control switch 287 in the ingot crane operator's cab is used for lowering the hoisting members 63 under other circumstances. As shown in Figure X, the control switch 194 is interposed between a traveling shoe 195 and a source of power indicated as the power line 240. The shoe 195 travels along a conducting rail 196 which extends along the path of travel of the ingot crane and is connected by a lead 197 to the conducting rail 282.

The operator of the carrier, by closing the control switch 276, can lower the hoisting members 63 when the carrier is in alignment with the rails 19 on which the buggy is operating, except that in the installation of Figure II the hoisting members 63 cannot be lowered by the carrier operator when the buggy is centered above the pit furnace. When the hoisting members 63 of the buggy are in position to be supported by the hangers 61 on the gantry crane 50 shown in Figure XI, the conducting segment 291 and shoe 293 permit the carrier operator to move the hoisting members 63 toward their lower positions even though the shoe 283 is thus lifted clear of the conducting rail 282. In any case in which the hoisting members 63 are moving toward their lower positions, with one of the control switches 276, 287 or 194 closed, the movement of the hoisting members continues until the limit switch 285 opens.

It is to be understood that a separate pair of rails 19 may be provided for each of the pits 11 as indicated in Figure XII, or only one rail 19 may be located between two adjacent pits as indicated in Figure I. Of course it will be necessary to provide a separate pair of rails 19 for each pit if the cover of each pit is provided with a carriage 64, or if it is desired to operate two buggies 18 simultaneously to handle the covers of two adjacent pits.

Only the conducting rails 169 and 269 are shown in Figure V, but it is to be understood that the stationary conducting rails 156, 256, 182 and 282 extend rearward from the conducting rails 169 and 269. For the sake of simplicity, Figures II and VI show only one of the traveling shoes mounted on the carrier, namely the shoe 134, and show only the one conducting rail 135.

It is to be further understood that an electro-mechanical means, such as the electro-mechanical clutch, may be substituted for the draft coupling 65, 67 and the shaft coupling 107, 108, as indicated in Figure XIII. Separate electro-mechanical means may be substituted for each mechanical coupling replaced or a single electro-mechanical means 107a, 108a on the buggy 18a and the carriage 64a may be substituted for the shaft coupling members 107 and 108 to perform the functions of both a drive coupling and a draft coupling, the draft coupling members 65 and 67 then being omitted.

This is a continuation-in-part of application Serial No. 520,771, filed July 8, 1955, now abandoned.

The foregoing description is intended to illustrate and not limit the following claims. Various modifications can be incorporated in my invention without departing from the spirit and scope thereof.

I claim:

1. Cover handling apparatus for serving a row of pit furnaces comprising, in combination, a stationary track for each furnace, running transverse to the row of furnaces, a buggy that is adapted to travel on any of such tracks and is removable therefrom, hoist mechanism for lifting the cover from a furnace, a drive on the buggy for supplying power to lift the cover from a furnace when the buggy is on the track that corresponds to such furnace and is operatively connected through said hoist mechanism to such cover, a buggy drive for traversing the buggy on any of such tracks to move the buggy independently of the corresponding furnace cover, and to move the cover with the buggy when the cover is operatively connected to the buggy and has been lifted, such stationary tracks being at the same level, and a traveling carrier for receiving and transporting the buggy, having a track at the same level as such stationary tracks, which is movable along a path that is parallel to and wholly at one side of the row of furnaces, each of such stationary tracks extending to the path of movement of the carrier and forming an extension of the track on the carrier whenever the carrier is stopped opposite to such stationary track, to permit the buggy to be received from or delivered to any of such stationary tracks by the carrier.

2. Cover handling apparatus as claimed in claim 1 wherein at least one furnace cover is provided with a carriage which travels on the same track as the buggy, which can be operatively connected to the buggy to move with the buggy, and which is equipped with the cover hoisting mechanism that can be operated by the drive on the buggy when the carriage is operatively connected to the buggy.

3. Cover handling apparatus for serving a row of pit furnaces comprising, in combination, a stationary track for each furnace, running transverse to the row of furnaces, at least one furnace cover being provided with a carriage that travels on such track and is equipped with cover hoisting mechanism, a buggy that is adapted to travel on any of such tracks and is removable therefrom, a drive on the buggy for supplying power to lift a furnace cover by means of said hoisting mechanism, a buggy drive for traversing the buggy on any of such tracks to move the buggy independently of the corresponding furnace cover, and to move the cover with the buggy when the cover is operatively connected to the buggy and has been lifted, and means for guiding the buggy along a path that is parallel to and wholly at one side of the row of furnaces, each of such tracks extending to such guiding means, to permit the buggy to be transferred between such guiding means and any of such tracks.

4. Cover handling apparatus as claimed in claim 3 wherein the buggy is provided with a draft coupling for connecting the carriage to travel with the buggy and a drive coupling for operating the cover hoisting mechanism.

5. Apparatus for moving the covers of a row of furnaces, comprising: first rail means located along one side of said row; a carrier adapted to travel along said rail means; second rail means extending from said first rail means toward each furnace cover; a buggy that is adapted to travel on any of said second rail means and is removable therefrom and has means attachable to each of said furnace covers for moving and hoisting the same; a first motor for moving said carrier along said first rail means; a second motor for moving said buggy along each of said second rail means; and a third motor for raising and lowering said hoisting means; said first, second and third motors being of the reversible type; and a control circuit connected to said motors, said control circuit comprising: first and second sources of voltage having a common ground; a series circuit connected across said first voltage source and including said first motor, a first limit switch actuated when said carrier is at a first end of said first rail means, a first control switch for starting the travel of said carrier from said first end of the first rail means, a second limit switch actuated when said buggy is aligned for travel along any of said second rail means, and a second control switch connected in parallel around said first control switch and second limit switch for by-passing any furnace of the row; a second series circuit connected across said second voltage source and including said first motor, a third limit switch actuated when said carrier is at the second end of said first rail means, a third control switch for starting the travel of said carrier from said second end of the first rail means, a second pair of contacts on said second limit switch actuated when said buggy is aligned for travel along any of said second rail means, and a fourth control switch connected in parallel around said third control switch and said second pair of contacts of the second limit switch for bypassing any furnace of the row; a third series circuit connected across said first voltage source and including said second motor, a fifth control switch for controlling movement of the buggy in a first direction, a fourth limit switch actuated when said buggy is supporting a cover and is at the end of travel desideratum in said first direction, a fifth limit switch connected in parallel around said fourth limit switch and actuated when said buggy is at the end of travel desideratum in said first direction on said carrier, a sixth limit switch actuated when said buggy is at the end of travel desideratum, said sixth limit switch being interposed between said first voltage source and said fifth control switch, a fourth series circuit connected across said second voltage source and including said second motor, a seventh control switch for controlling movement of the buggy in a second direction opposite to the first, and a seventh limit switch actuated when said buggy is at the end of the travel desideratum in said second direction; a fifth series circuit connected across said first voltage source and including said third motor, a ninth control switch mounted on said carrier for elevating said hoisting means, an eighth limit switch actuated when said hoisting means is at the end of its upward travel, and a second pair of contacts on said seventh limit switch for preventing the lowering of said hoisting means when said buggy is positioned over a cover; a sixth series circuit connected across said second voltage source and including said third motor, an eleventh control switch mounted on said carrier for lowering said hoisting means, and a ninth limit switch actuated when said hoisting means is at the end of its downward travel.

6. Apparatus for moving the covers of a row of furnaces, comprising: first rail means located along one side of said row; a carrier adapted to travel along said rail means; second rail means extending from said first rail means toward each furnace cover; a buggy that is adapted to travel on any of said second rail means and is removable therefrom and has means attachable to each of said furnace covers for moving and hoisting the same; a first motor for moving said carrier along said first rail means; a second motor for moving said buggy along each of said second rail means; and a third motor for raising and lowering said hoisting means; said first, second and third motors being of the reversible type; and a control circuit connected to said motors, said control circuit comprising: first and second sources of voltage having a common ground; a series circuit connected across said first voltage source and including said first motor, a first limit switch actuated when said carrier is at a first end of said first rail means, a first control switch for starting the travel of said carrier from said first end of the first rail means, a second limit switch actuated when said buggy is aligned for travel along any of said second rail means, and a second control switch connected in parallel around said first control switch and second limit switch for by-passing any furnace of the rows; a second series circuit connected across said second voltage source and including said first motor, a third limit switch actuated when said carrier is at the second end of said first rail means, a third control switch for starting the travel of said carrier from said second end of the first rail means, a second pair of contacts on said second limit switch actuated when said buggy is aligned for travel along any of said second rail means, and a fourth control switch connected in parallel around said third control switch and said second pair of contacts of the second limit switch for by-passing any furnace of the row; a third series circuit connected across said first voltage source and including said second motor, a fifth control switch for controlling movement of the buggy in a first direction, a fourth limit switch actuated when said buggy is supporting a cover and is at the end of travel desideratum in said first direction, a fifth limit switch connected in parallel around said fourth limit switch and actuated when said buggy is at the end of travel desideratum in said first direction on said carrier, a sixth control switch mounted in the overhead ingot crane for controlling movement of the buggy in said first direction, a sixth limit switch actuated when said buggy is at the end of travel desideratum, said sixth control and said sixth limit switches being interposed between said first voltage source and said fifth control switch, a fourth series circuit connected across said second voltage source and including said second motor, a seventh control switch for controlling movement of the buggy in a second direction opposite to the first, a seventh limit switch actuated when said buggy is at the end of the travel desideratum in said second direction, and an eighth control switch mounted in the overhead ingot crane for controlling movement in said second direction; a fifth series circuit connected across said first voltage source and including said third motor, a ninth control switch mounted on said carrier for elevating said hoisting means, an eighth limit switch actuated when said hoisting means is at the end of its upward travel, a second pair of contacts on said seventh limit switch for preventing the lowering of said hoisting means when said buggy is positioned over a cover, and a tenth control switch mounted on the overhead ingot crane and in parallel around said ninth control switch for elevating said hoisting means; a sixth series circuit connected across said second voltage source and including said third motor, an eleventh control switch mounted on said carrier for lowering said hoisting means, a ninth limit switch actuated when said hoisting means is at the end of its downward travel, a twelfth control switch mounted on the overhead ingot crane and in parallel around said eleventh control switch for lowering said hoisting means, and a thirteenth control switch mounted on said overhead ingot crane and in parallel with said eleventh and twelfth control switches for replacing a cover on a furnace.

7. Apparatus for moving the covers of a row of furnaces, comprising: first rail means located along one side of said row; a carrier crane adapted to travel along said rail means; second rail means extending from said first rail means toward each furnace cover; a carriage that travels on said second rail means and is equipped with cover hoisting mechanism; a buggy that travels on said second rail means and is adapted to be removed therefrom and carried by said crane; a drive on said buggy for supplying power to lift a furnace cover; a buggy drive means for operatively connecting said carriage with said buggy for traversing the same; a first motor for moving said crane along said first rail means; a second motor for moving said buggy along each of said second rail means; a third motor for operating said hoisting mechanism; said first, second and third motors being of the reversible type; and a control circuit connected to said motors, said control circuit comprising: first and second sources of voltage having a common ground; a first series circuit connected across said first voltage source and including said first motor, a first limit switch actuated when said crane is at a first end of said first rail means, a first control switch for starting the travel of said crane from said first end of the first rail means, a second limit switch actuated when said buggy is aligned for travel along any of said second rail means, a second control switch connected in parallel around said first control switch and said second limit switch for by-passing any furnace of the row, a third limit switch actuated when said buggy is in position to be picked up by said carrier crane, and a safety switch connected in parallel with said third limit switch and actuated when the hoisting mechanism is in raised position to prevent interference of said hoisting mechanism with said carrier crane; a second series circuit connected across said second voltage source and including said first motor, a fourth limit switch actuated when said carrier crane is at the second end of said first rail means, a third control switch for starting the travel of said carrier crane from said second end of the first rail means, a second pair of contacts on said second limit switch actuated when said buggy is aligned for travel along any of said second rail means, a fourth control switch connected in parallel around said third control switch and said second pair of contacts of the second limit switch for by-passing any furnace of the row, a second pair of contacts on said third limit switch actuated when said buggy is in position to be picked up by said carrier crane, and a second pair of contacts on said safety switch actuated when said hoisting means is in raised position to prevent interference of said hoisting means with said crane; a third series circuit connected across said first voltage source and including said second motor, a fifth control switch for controlling movement of the buggy in a first direction, a fifth limit switch actuated when said buggy is in position to be picked up by said carrier crane, a solenoid for releasing a draft coupling, and a seventh control switch for controlling said solenoid; a fourth series circuit connected across said second voltage source and including said second motor, an eighth control switch for controlling movement of the buggy in a second direction opposite to the first, and a sixth limit switch actuated when the coupling member of said buggy engages the coupling member of said carriage, a fifth series circuit connected across said first voltage source and including said third motor, a tenth control switch mounted on said carrier crane for operating said hoisting means, a seventh limit switch actuated when said hoisting means is at the end of its upward travel, and a third pair of contacts on said third limit switch actuated when said buggy is in position to be picked up by said carrier crane, and a sixth series circuit connected across said second voltage source and including said third motor, a twelfth control switch mounted on said carrier crane for lowering said hoisting means, and an eighth limit switch actuated when said hoisting means is at the end of its downward travel.

8. Apparatus for moving the covers of a row of furnaces, comprising: first rail means located along one side of said row; a carrier crane adapted to travel along said rail means; second rail means extending from said first rail means toward each furnace cover; a carriage that travels on said second rail means and is equipped with cover hoisting mechanism; a buggy that travels on said second rail means and is adapted to be removed therefrom and carried by said crane; a drive on said buggy for supplying power to lift a furnace cover; a buggy drive means for operatively connecting said carriage with said buggy for traversing the same; a first motor for moving said crane along said first rail means; a second motor for moving said buggy along each of said second rail means; a third motor for operating said hoisting mechanism; said first, second and third motors being of the reversible type; and a control circuit connected to said motors, said control circuit comprising: first and second sources of voltage having a common ground; a first series circuit connected across said first voltage source and including said first motor, a first limit switch actuated when said crane is at a first end of said first rail means, a first control switch for starting the travel of said crane from said first end of the first rail means, a second limit switch actuated when said buggy is aligned for travel along any of said second rail means, a second control switch connected in parallel around said first control switch and said second limit switch for by-passing any furnace of the row, a third limit switch actuated when said buggy is in position to be picked up by said carrier crane, and a safety switch connected in parallel with said third limit switch and actuated when the hoisting mechanism is in raised position to prevent interference of said hoisting mechanism with said carrier crane; a second series circuit connected across said second voltage source and including said first motor, a fourth limit switch actuated when said carrier crane is at the second end of said first rail means, a third control switch for starting the travel of said carrier crane from said second end of the first rail means, a second pair of contacts on said second limit switch actuated when said buggy is aligned for travel along any of said second rail means, a fourth control switch connected in parallel around said third control switch and said second pair of contacts of the second limit switch for by-passing any furnace of the row, a second pair of contacts on said third limit switch actuated when said buggy is in position to be picked up by said carrier crane, and a second pair of contacts on said safety switch actuated when said hoisting means is in raised position to prevent interference of said hoisting means with said crane; a third series circuit connected across said first voltage source and including said second motor, a fifth control switch for controlling movement of the buggy in a first direction, a fifth limit switch actuated when said buggy is in position to be picked up by said carrier crane, a sixth control switch mounted in the overhead ingot crane for controlling movement of the buggy in said first direction, a solenoid for releasing a draft coupling, and a seventh control switch for controlling said solenoid; a fourth series circuit connected across said second voltage source and including said second motor, an eighth control switch for controlling movement of the buggy in a second direction opposite to the first, a sixth limit switch actuated when the coupling member of said buggy engages the coupling member of said carriage, and a ninth control switch mounted in the overhead ingot crane for controlling movement in said second direction; a fifth series circuit connected across said first voltage source and including said third motor, a tenth control switch mounted on said carrier crane for operating said hoisting means, a seventh limit switch actuated when said hoisting means is at the end of upward travel, a third pair of contacts on said third limit switch actuated when said buggy is in position to be picked up by said carrier crane, and an eleventh control switch mounted on the overhead ingot crane and in parallel around said tenth control switch for elevating said hoisting means; and a sixth series circuit connected across said second voltage source and including said third motor, a twelfth control switch mounted on said carrier crane for lowering said hoisting means, an eighth limit switch actuated when said hoisting means is at the end of its downward travel, and a thirteenth control switch mounted on the overhead ingot crane and in parallel around said twelfth control switch for lowering said hoisting means.

9. Apparatus for moving the cover of a furnace of rectangular horizontal cross-section comprising: a first pair of rails parallel to one side of said furnace, located one on each side thereof, and supported on the floor; a buggy adapted to travel along said rails; a first motor on said buggy for moving said buggy along said rails; vertically disposed members on said buggy; grasping means located on each end of each member; means on said cover for engaging the lower grasping means; a second motor on said buggy for moving said member vertically; a second pair of rails located parallel to one end of said furnace, one of which is at a distance from said furnace greater than the length of said cover; a gantry-type crane adapted to travel along said second pair of rails, means on said crane for engaging the upper grasping means; a third motor on said gantry crane for moving said crane along said second pair of rails; a cab on said crane; and control means for controlling said crane and said buggy.

10. Apparatus for moving the cover of a furnace comprising: a first pair of parallel rails straddling said furnace and supported on the floor, a buggy adapted to move along said rails, first power means for driving said buggy along said pair of rails, a second pair of parallel rails one of which is at a distance from said furnace greater than the longest dimension of said cover measured parallel to the first pair of rails, a crane supported by said second pair of rails and adapted to travel therealong, second power means for driving said crane, means on said buggy for lifting said cover, means on said buggy for grasping said crane and lifting said buggy from said rails, and control means for controlling said crane and said buggy.

11. Apparatus for moving the covers of a row of furnaces, comprising: first rail means located along one side of said row; a crane adapted to travel along said rail means; second rail means extending from said first rail means toward each furnace cover; a buggy having means attachable to said crane for transport from one to another of said second rail means, and attachable to each of said furnace covers for moving the same; a first motor for raising and lowering said attaching means; a second motor for moving said buggy along each of said second rail means; a third motor for moving said crane along said first rail means; said first, second and third motors being of the reversible type; and a control circuit connected to said motors, said control circuit comprising: first and second sources of voltage having a common ground; a series circuit connected across said first voltage source and including said first motor, a first limit switch actuated when said buggy is positioned for attachment to said crane, a second limit switch actuated when the attaching means is in raised position; and a first motor control switch; a second series circuit connected across said second voltage source and including said first motor, a third limit switch actuated when said buggy is positioned for raising a furnace cover, a fourth limit switch positioned to be actuated when the attaching means is in lowered position, a manual switch connected in parallel around the third limit switch, and a second motor control switch; a third series circuit connected across said first voltage source and including said second motor, a second contact of said third limit switch, and a third motor control switch; a fourth series circuit connected across said second voltage source and including said second motor, a second contact of said first limit switch, and a fourth motor control switch; a fifth series circuit connected across the first voltage source and including the third motor, contacts of the first limit switch and a limit switch actuated when said buggy is positioned for attachment to said crane and the attaching means is in raised position, in parallel, a fifth limit switch actuated when the crane is in position to receive the buggy from a furnace, and a fifth motor control switch; and a sixth series circuit connected across the second voltage source and including the third motor, contacts of the first limit switch and a limit switch actuated when said buggy is positioned for attachment to said crane and the attaching means is in raised position, in parallel, a second contact of the fifth limit switch, and a sixth motor control switch.

12. Apparatus according to claim 11 and including second and third manual switches in parallel with the fifth limit switch contacts in the fifth and sixth series circuits.

13. Cover handling apparatus for serving a row of pit furnaces comprising, in combination, a stationary track for each furnace, running transverse to the row of furnaces, a buggy that is adapted to travel on any of such tracks and is removable therefrom, hoisting mechanism for lifting the cover from a furnace, a drive on the buggy for supplying power to lift the cover from a furnace when the buggy is on the track that corresponds to such furnace and is operatively connected through said hoisting mechanism to such cover, a buggy drive for traversing the buggy on any of such tracks to move the buggy independently of the corresponding furnace cover, and to move the cover with the buggy when the cover is operatively connected to the buggy and has been lifted, and means for guiding the buggy along a path that is parallel to and wholly at one side of the row of furnaces, each of such tracks extending to such guiding means, to permit the buggy to be transferred between such guiding means and any of such tracks.

14. Cover handling apparatus as claimed in claim 13 wherein the buggy is movable on each track to a position directly above the corresponding furnace cover, and is provided with the hoisting mechanism for lifting the cover when the buggy is in such position.

15. Cover handling apparatus as claimed in claim 13 wherein the guiding means comprises a traveling carrier for receiving and transporting the buggy.

16. Cover handling apparatus as claimed in claim 15 wherein the carrier is a crane overhanging the ends of the stationary tracks, and the buggy is provided with hoisting mechanism that is capable of lifting a cover when the buggy is located over such cover and is capable of lifting the buggy off the stationary track when the buggy is located under the crane.

17. Cover handling apparatus as described in claim 13 further comprising control means to control the operation of said buggy and said hoisting mechanism.

18. Apparatus for moving the covers of a row of furnaces providing: first rail means located along one side of said row; a buggy carrier adapted to travel along said first rail means; second rail means extending from said first rail means toward each furnace cover; a buggy that is adapted to travel on any of said second rail means and has means engageable with said buggy carrier for transport from one to another set of second rail means, and means attachable to each of said furnace covers for moving the same; and control means for controlling the operation of said buggy carrier and said buggy.

No references cited.